Oct. 9, 1928.
P. FERRARI
1,687,088
SAFETY DEVICE FOR TRACTION OPERATION
Filed Sept. 24, 1926
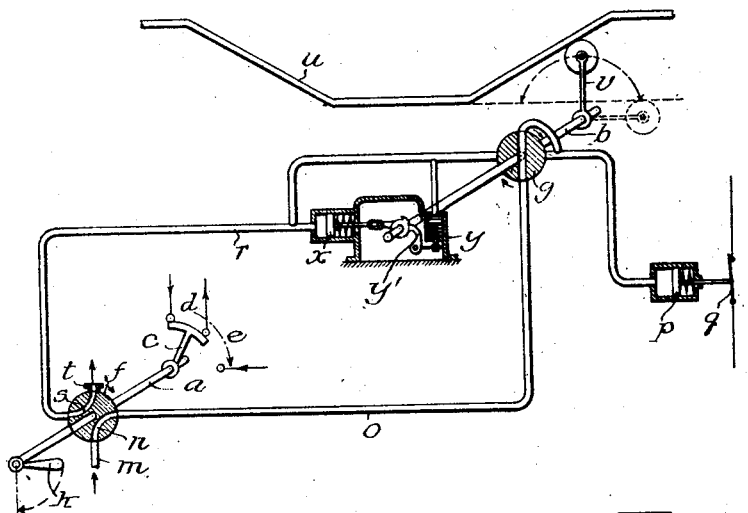
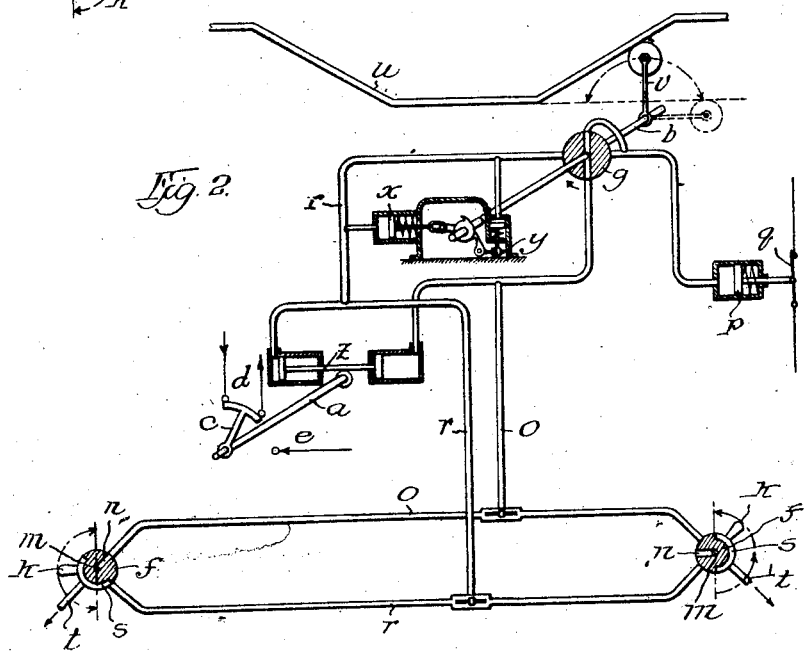
Inventor
Plinio Ferrari Patented Oct. 9, 1928.

1,687,088

UNITED STATES PATENT OFFICE.

PLINIO FERRARI, OF MILAN, ITALY, ASSIGNOR TO AKTIENGESELLSCHAFT BROWN BOVERI & CIE., OF BADEN, SWITZERLAND, A JOINT-STOCK COMPANY OF SWITZERLAND.

SAFETY DEVICE FOR TRACTION OPERATION.

Application filed September 24, 1926, Serial No. 137,583, and in Italy September 26, 1925.

This invention relates to electric railway operation, and pertains to equipment for operation on systems wherein different sections of the line are operated at different voltages. The present invention has to do particularly with control mechanism on the motor car whereby proper changes in the switch connections of the motors will be effected automatically upon the passage of the vehicle from a section of low voltage to a section of high voltage.

A particular object of the invention is the provision of improved apparatus for operation and control of the change-over switch.

A further object is the provision of mechanism which will be certain in operation and through which control of a plurality of motor cars in the same train may be accomplished automatically.

Other and further objects will be pointed out or indicated hereinafter or will be apparent to one skilled in the art upon an understanding of the invention or upon its employment in practice.

For the purpose of this application, I illustrate two arrangements whereby the invention may be embodied and practiced, but it is to be understood that these are presented for illustration only, and are not to be accorded any effect for the limitation of the claims short of the true and most comprehensive scope of the invention in the art.

In the drawing,

Fig. 1 is a diagram of switch operating and control apparatus for installation on an electric railway vehicle; and Fig. 2 is a diagram of a modified form of such apparatus.

The present invention is in the nature of improvement on the form of apparatus illustrated and described in the copending application of Abraham Couwenhoven, Serial No. 92,325, filed March 4, 1926. The application referred to describes a safety device for protecting traction motors on lines operating with more than one voltage, according to which a lever on the car strikes a ramp mounted on the track when passing from one voltage to another and thus opens the main switch. According to the present invention the coupling between the control drum and the operating gear of the main switch is dispensed with, and is replaced by an operating mechanism which recloses the main switch automatically after the necessary changes in the connections for high voltage working have been made.

The drawing gives two examples of the invention as applied to electric vehicles with pneumatically operated main switches. In Fig. 1 the voltage change-over switch must be operated by hand; in the arrangement shown in Fig. 2 this is effected pneumatically. The same reference letters are used as in the former application. Thus $a$ is the control shaft for the air cock $f$ and the change-over switch $c$, the latter having two positions, $d$ for low-voltage and $e$ for high voltage; $b$ is the operating shaft for the air cock $g$ which controls the air cylinder $p$ actuating the main switch $q$; $u$ is the ramp for the striking lever $v$, $k$ the handle of the change-over switch; $n$ and $s$ the passages in the air cock $f$; $m$ the compressed air inlet; $t$ the outlet, and $o$ and $r$ the pipes connecting the cocks $f$ and $g$. According to the present invention the cock $g$ is not operated by hand, but through the agency of a spring loaded air cylinder $x$, and can be retained in the high voltage position by means of a pneumatic catch mechanism $y$ having a detent $y'$ adapted to engage a keeper on shaft $b$ when the shaft is in high voltage position.

The action is as follows. If the car enters a high voltage section with the switch $c$ still in position $d$ for low voltage working, the lever $v$ strikes against the rail $u$ and takes up the position shown by the dotted lines, the detent engaging the keeper on shaft $b$ to latch it in the new position. The air cock $g$ is thus rotated through 90° and the main cylinder $p$, which was connected to the compressed air supply at $m$ through the pipe $o$ and passage $n$, is put into communication with the atmosphere at $t$ by way of the pipe $r$ and the passage $s$. The main switch $q$ is thus opened. If the driver now turns the switch $c$ from position $d$ into position $e$ by means of the handle $k$, the cylinders $p$, $x$ and $y$ are simultaneously connected to the compressed air supply at $m$ via the passage $n$ and the pipe $r$. The cylinder $p$ closes the main switch $q$, the cylinder $x$ prevents the air cock $g$ from being turned back, and the cylinder $y$ retracts the detent $y'$ holding the shaft $b$.

If the car enters a low voltage section of line the driver is at once advised of this fact by the sudden drop in the speed and, therefore, turns the handle k into the position for low voltage operation. This action opens the three cylinders p, x and y to atmosphere at t, as shown in the drawing. The spring in cylinder x rotates the shaft b through 90° back to its initial position, thus raising the striking lever v and returning the air cock g to the position shown. This again admits compressed air to the cylinder p and the switch q is closed.

In the arrangement shown in Fig. 2, the shaft a, instead of being hand operated, is geared to the pneumatic motor z which is controlled in the same way as the cylinders p, x and y either from one of the two air cocks f on the driver's platform or, when circumstances require, from the air cock g when actuated by the striking lever. The same reference letters are used as in Fig. 1. In this arrangement, air pipe r is extended to supply the left hand cylinder of the motor z and pipe o is extended to supply the right hand cylinder. Pipes r and o are controlled by two valves f, from either of which the operation of the apparatus may be effected. In the position shown, the left hand valve f establishes communication between the pressure line m and pipe o through passage n, thus supplying the right hand cylinder of the pneumatic motor z and placing switch c in the low-voltage position; the switch q being held closed by pressure in cylinder p transmitted through valve g. When the lever v is swung to the high-voltage position, wherein it is latched by detent y', both cylinder p and the right hand cylinder of motor z are vented through passage s of the left hand valve f, permitting main switch p to be opened by its spring. Then, to position change-over switch c for the high-voltage connection, valve f is moved to place pressure line m in communication with pipe r, passage s being thereby placed in communication with pipe o and vent t. Pressure is thus supplied to the left hand cylinder of motor z and change-over switch c moved to position e. Cylinder x is likewise supplied with pressure, to hold valve g in position to establish communication between pipe r and cylinder p, thus closing the main switch, and pressure in cylinder y unlatches shaft b. If the operator, therefore, wishes to change from low to high voltage position, he turns valve f by its handle to place passage n in communication with pipe r and passage s in position to vent pipe o to atmosphere through t. This supplies pressure to the left hand cylinder of motor z, and also vents cylinder p permitting switch q to be opened by its spring. It also supplies pressure to cylinder x to rotate shaft b and place pipe r in communication with cylinder p to again close switch q, the change-over switch meanwhile having been moved to the position e. For changing from high to low voltage, the valve f is restored to the position shown. The apparatus may be operated and controlled in like fashion from the right hand valve f.

What I claim is:

1. A protective device for traction motors operating on a system having high and low voltage sections, comprising, in combination, a main switch on the vehicle, a throw-over switch on the vehicle, a control device for the main switch, a throwing device at the junction of high and low voltage sections for cooperation with the control device, and means for latching the control device in position for opening the main switch.

2. A protective device for traction motors operating on a system having high and low voltage sections, comprising, in combination, a main switch on the vehicle, a throw-over switch on the vehicle, a control device for the main switch, a throwing device at the junction of high and low voltage sections for cooperation with the control device to cause opening of the main switch, means for latching the control device, and means controlled in conjunction with the throw-over switch for unlatching the control device.

3. In apparatus for controlling an electric vehicle disposed for operation along coextensive high and low voltage supply lines, a supply switch carried by such vehicle, means carried by such vehicle and having a first and a second position and being operable when in said first position to provide for low voltage operation of said vehicle and being operable when in said second position to provide for high voltage operation of the same, relatively fixed means disposed at the junction of such lines, means carried by such vehicle and disposed for coaction with said relatively fixed means and for movement to a given position upon and by virtue of such coaction and being operable when in said given position concurrently with disposition of said first-named means in said first position thereof to effect opening operation of said supply switch, means for holding said last-named means in said given position thereof, and means cooperable with the said first-named means when the same is in said second position thereof for effecting release of said holding means and closing action of said supply switch.

In testimony whereof I have hereunto subscribed my name at Milan, Italy, this 9th day of September, A. D. 1926.

PLINIO FERRARI.